(12) United States Patent
Ferguson et al.

(10) Patent No.: US 6,696,010 B2
(45) Date of Patent: Feb. 24, 2004

(54) METHOD AND APPARATUS FOR FORMING BLOW MOLDED PLASTIC CONTAINER WITH INCLINED MOUTH

(75) Inventors: Gary Ferguson, Tallmadge, OH (US); Richard C. Darr, Medina, OH (US); Richard R. Dasch, Medina, OH (US)

(73) Assignee: Plastipak Packaging, Inc., Plymouth, MI (US)

( * ) Notice: Subject to any disclaimer, the term of this patent is extended or adjusted under 35 U.S.C. 154(b) by 168 days.

(21) Appl. No.: 10/138,161

(22) Filed: May 1, 2002

(65) Prior Publication Data

US 2003/0132557 A1 Jul. 17, 2003

Related U.S. Application Data

(63) Continuation-in-part of application No. 10/052,841, filed on Jan. 15, 2002.

(51) Int. Cl.$^7$ ................................ B29C 49/64
(52) U.S. Cl. ................. 264/519; 264/524; 264/533; 264/534; 425/525; 425/526
(58) Field of Search ................... 264/519, 524, 264/533, 534; 425/525, 526

(56) References Cited

U.S. PATENT DOCUMENTS

| | | | |
|---|---|---|---|
| 3,608,017 A | | 9/1971 | Cines |
| 3,806,300 A | | 4/1974 | Hafele et al. |
| 4,116,608 A | | 9/1978 | Uhlig |
| 4,195,053 A | | 3/1980 | Lambarth |
| 4,419,323 A | | 12/1983 | Winchell |
| 4,640,855 A | * | 2/1987 | St. Clair .............. 222/572 |
| 5,069,614 A | | 12/1991 | Belmont |
| 5,178,817 A | | 1/1993 | Yamada et al. |
| 6,315,939 B1 | | 11/2001 | Mock et al. |
| 6,319,574 B1 | | 11/2001 | Slat |

* cited by examiner

Primary Examiner—Suzanne E. McDowell
(74) Attorney, Agent, or Firm—Robert H. Bachman

(57) ABSTRACT

Method and apparatus for forming a blow molded plastic container with a mouth and neck portion thereof which is inclined or angled with respect to the body portion of the container, including heating the neck of the container and bending the heated neck of the container.

18 Claims, 5 Drawing Sheets

METHOD AND APPARATUS FOR FORMING BLOW MOLDED PLASTIC CONTAINER WITH INCLINED MOUTH

CROSS-REFERENCE TO RELATED APPLICATION

This application is a Continuation-In-Part of copending U.S. patent application Ser. No. 10/052,841, filed Jan. 15, 2002.

BACKGROUND OF THE INVENTION

The present invention relates to a blow molded, plastic container having an inclined or angled mouth and neck portion, and a method and apparatus for preparing same.

Blow molded plastic containers, such as those made from polyethylene terephthalate, are widely used for many applications, such as, for example, as containers for drinks and cleaning products. These containers customarily have a straight mouth and neck portion, that is, a mouth and neck portion that are coaxial with the body portion of the container.

The preparation of these containers generally involves preparing a preform or parison with a mouth and neck portion that are coaxial with the preform body portion, holding the preform in a blow mold with the preform mouth and neck portion held coaxial with the preform body portion, and forming the desired container in the shape of the blow mold by stretching and blow molding.

For many applications it is desirable to prepare such a container with a mouth and neck portion at an angle to the body portion of the container. However, it is difficult to prepare such an angled mouth and neck portion container by conventional blow molding techniques. For example, such techniques may involve expensive and inconvenient multistage operations where an injected preform is clamped, stretched and blown in the mold at one station and a blow pin is inserted into the mold for blowing and/or compression molding at another station and the neck is bent at a subsequent station or in a subsequent stage of operation. Techniques such as this increase the cost of the container and complicate processing.

Alternatively, a conventional type apparatus cannot be satisfactorily used to mold a container with an angled mouth and neck portion since to do so would require the mold cavity to be aligned so that the desired angular neck is appropriately aligned with the blow pin. Significant processing problems result thereby, as well as problems with the resultant container.

In addition, it is difficult to fill an angled mouth plastic container with contents using conventional equipment.

Accordingly, it is a principal objective of the present invention to provide a new and improved method and apparatus for obtaining a blow molded, plastic container with an angled or inclined neck and mouth portion.

It is a still further objective of the present invention to provide an improved blow molded, plastic container with an angled or inclined neck and mouth portion.

It is an additional objective of the present invention to provide a method and apparatus as aforesaid which is easy and expeditious to use on a commercial scale, and which simply and conveniently provides improved containers as aforesaid.

Further objects and advantages of the present invention will appear hereinbelow.

SUMMARY OF THE INVENTION

In accordance with the present invention it has now been found that the foregoing objects and advantages are readily obtained.

The present invention provides a method of forming a blow molded plastic container, preferably polyethylene terephthalate although other plastic materials can be readily used, said container having a mouth and neck portion thereof which are inclined or angled with respect to the body portion of the container. The method comprises:

providing a blow molded plastic container having a closed base, a body portion extending from the base, a neck portion extending from the body portion and an open mouth above the neck portion; and heating the neck of the container and bending the heated neck of the container with a holding means that holds and bends the neck of the container to provide a mouth and neck portion oriented at an angle with respect to the body of the container.

Desirably, the blow molded plastic container is prepared from a parison or preform, with the resultant blow molded container having a mouth and neck portion that are straight or coaxial with the container body portion. The blow molded container with straight mouth an neck portion is then filled with contents, and the heating and bending desirably performed on the filled container. Each operation can be performed at a separate station, wherein the stations may be in-line for an efficient commercial operation. That is the blow molding operation may be performed at a first station, the filling operation performed at a second station, the heating operation performed at a third station, and the bending operation performed at a fourth station.

The apparatus of the present invention forms a blow molded plastic container with a mouth and neck portion thereof which is inclined or angled with respect to the body portion of the container, and comprises:

providing a blow molded plastic container having a closed base, a body portion extending from the base, a neck portion extending from the body portion and an open mouth above the neck portion;

heating means for heating the neck of the container; and a holding means for holding and bending the heated neck of the container to provide a mouth and neck portion oriented at an angle with respect to the body of the container.

Other features and advantages of the present invention will appear hereinbelow.

BRIEF DESCRIPTION OF THE DRAWINGS

The present invention will be more readily understandable from a consideration of the following illustrative drawings, wherein.

DETAILED DESCRIPTION OF PREFERRED EMBODIMENTS

Figure 1:
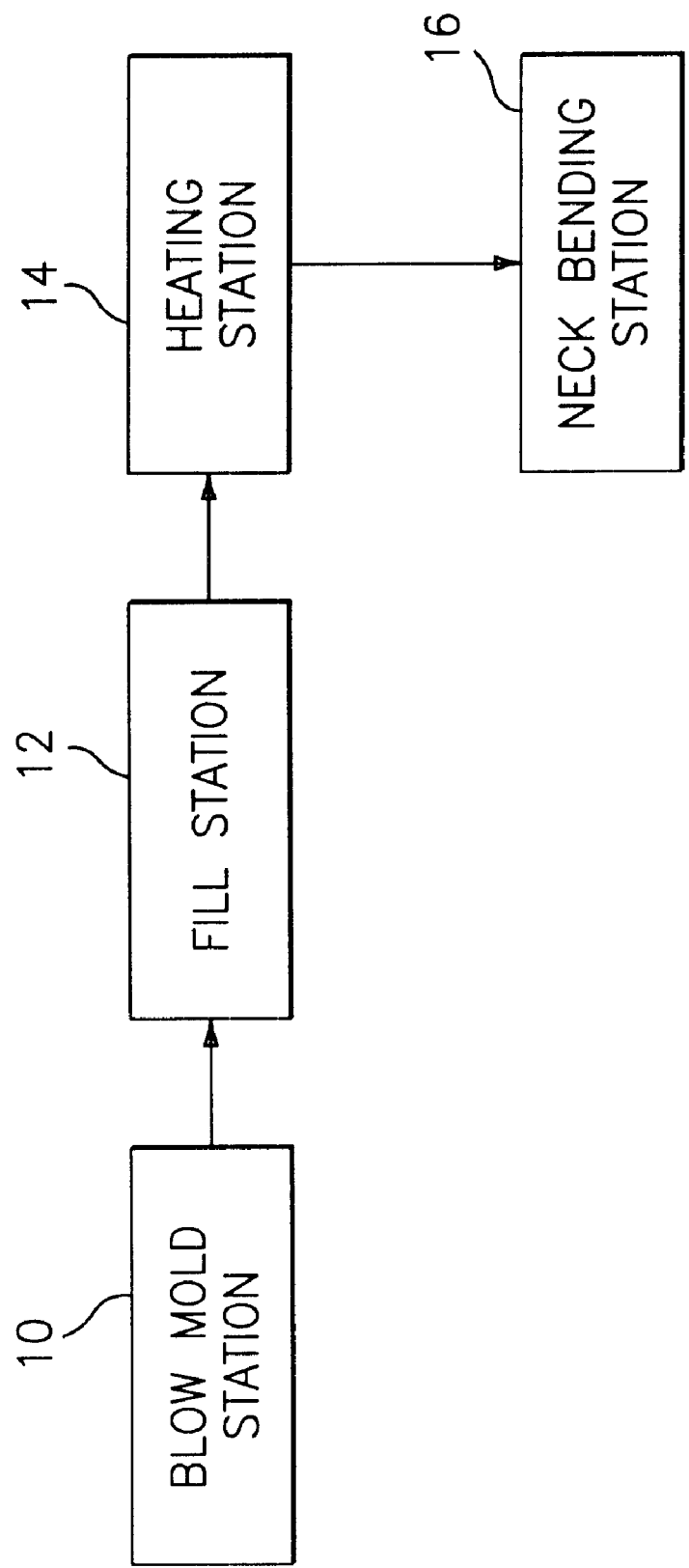
FIG. 1 is a flow sheet showing the separate stations of the present invention.
Figure 2:
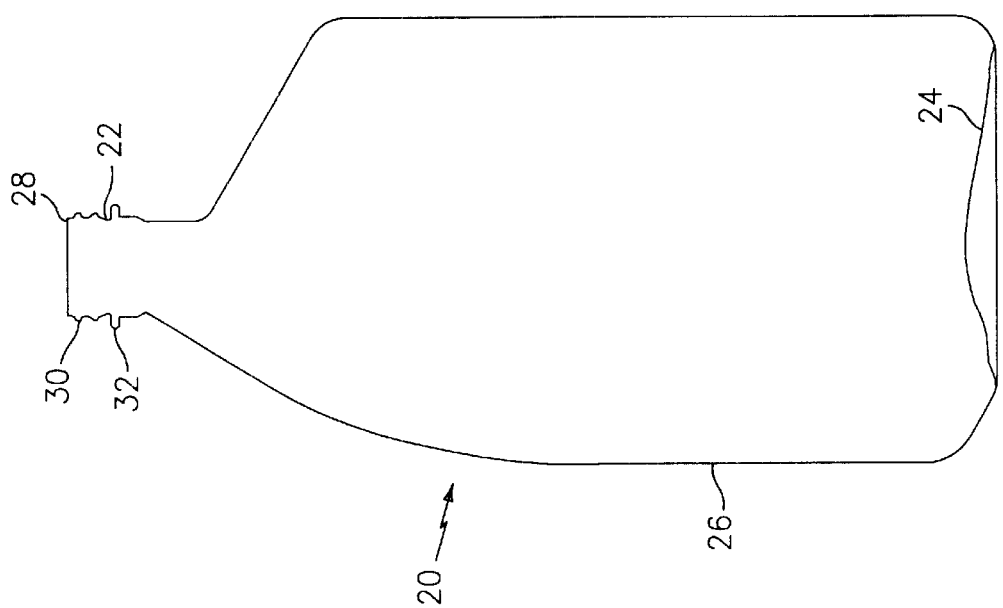
FIG. 2 is a side view of a representative blow molded container before filling and neck bending.

Referring to the drawings, FIG. 1 is a flow sheet showing the separate stations for preparing the inclined or angled neck container in accordance with the present invention. Station 10 is the blow molding station wherein a blow molded, plastic container is prepared from a parison or preform, with the resultant blow molded container 20 as shown in FIG. 2 having a straight neck 22. The container 20 has a closed base 24, body portion 26 extending upwardly from the base, neck portion 22 extending upwardly from the body portion, and open mouth 28 above the neck. If desired, the container may have a threaded neck portion 30 and outwardly extending flanges 32 below the threaded portion. As indicated above, the neck portion 22 extends upwardly in a straight direction and is not angled or inclined. Thus, the blow molded container, which is desirably biaxially oriented, may be readily prepared on conventional equipment. The particular configuration shown in FIG. 2 is representative only and naturally any suitable or desired size or shape container may be prepared.

Station 12 is the fill station wherein container 20 with its straight neck is filled with contents. This also readily uses conventional filling equipment and desirably is preformed at a separate station from station 10 and in-line with station 10.

Station 14 is the heating station wherein the neck 22 of the filled container 20 is heated in preparation for the neck bending operation. Desirably and advantageously this may also be preformed at a separate station from stations 10 and 12 and in-line therewith.

Figure 3:
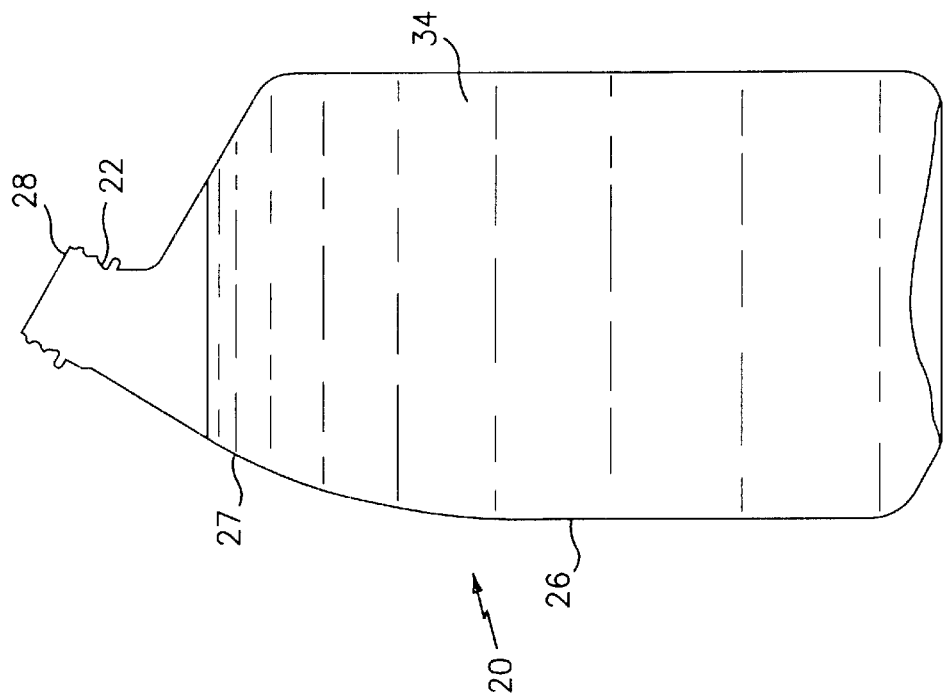
FIG. 3 is a side view of a representative blow molded container after filling and neck bending.

Station 16 is the neck bending station wherein the heated neck 22 of the filled container 20 is bent to provide a mouth 28 and neck portion 22 oriented at an angle with respect to the body 26 of container 20. FIG. 3 shows container 20 filled with contents 34, with mouth 28 and neck portion 22 oriented at an angle with body 26 of container 20, preferably at an angle of less than 45°. As clearly shown in FIG. 3, in cross section one side of upper body portion 27 includes a gradual, inclined configuration extending to the angled neck.

Figure 4:
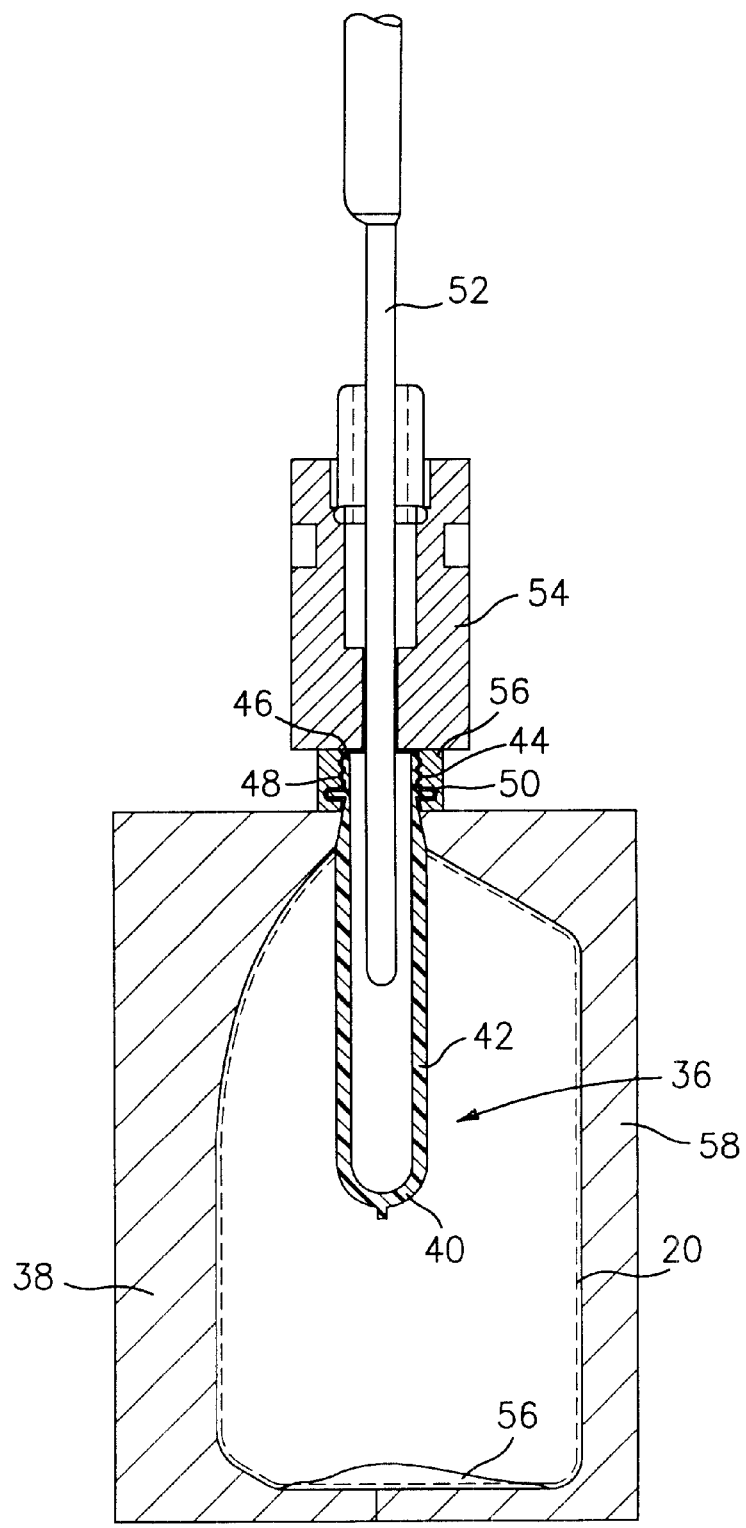
FIG. 4 is a side view showing a preform positioned in a blow mold with a stretch rod positioned in the preform and a blow nozzle positioned above the blow mold.

FIG. 4 is a side view showing the preparation of blow molded container 20. In accordance with FIG. 4, a straight, cylindrical plastic preform or parison 36 is positioned in blow mold 38. Parison 36 has a closed base 40, a straight body portion 42 extending upwardly therefrom, a straight neck portion 44 extending upwardly from the body portion, and an open mouth 46. If desired, the preform has a threaded neck portion 48 and an outwardly extending flange 50, which aids in seating the preform 36 in the blow mold 38. The blow mold 38 is closed on the preform firmly seating the preform in the blow mold.

Stretch rod 52 is positioned within the preform and blow nozzle 54 is placed above the preform engaging open mouth 46. If desired, the blow nozzle 54 may include downwardly extending flange 56 which is moved into engagement with the outside of neck portion 44. In accordance with conventional procedure, stretch rod 52 is preferably fully extended in the clamped preform to extend the preform to the base of the blow mold to provide an extended preform. High pressure air is then introduced into the extended preform from blow nozzle 54 from a high pressure air source (not shown) to expand or stretch the extended preform into conformity with blow mold cavity 58 and form blow molded container 20 shown in phantom in FIG. 4, desirably biaxially oriented.

Figure 5:
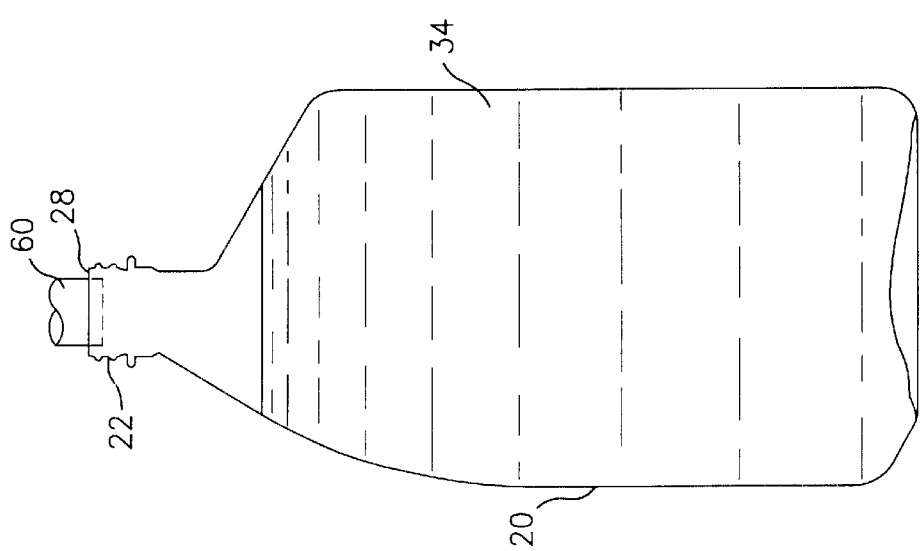
FIG. 5 is a side view of the filling station.

FIG. 5 is a side view of the filling station wherein container 20 is filled with contents 34 via filling nozzle 60 which fills container 20 through the mouth 28 and straight, neck 22 in a conventional manner. Filling nozzle 60 is connected to a source of filling material (not shown) and may hold the container by the neck to firmly retain the container thereon. The base may also be retained on a moving platform (not shown) which may aid in moving the container from station to station.

Figure 6:
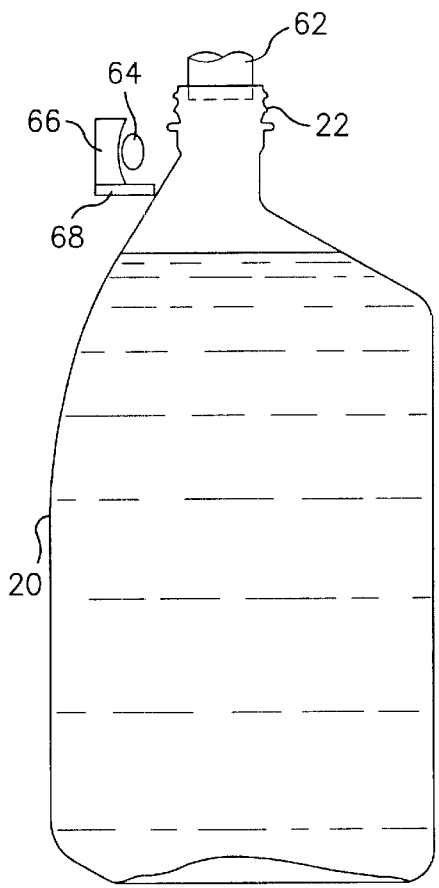
FIG. 6 is a side view showing the filled, blow molded bottle at the heating station.
Figure 7:
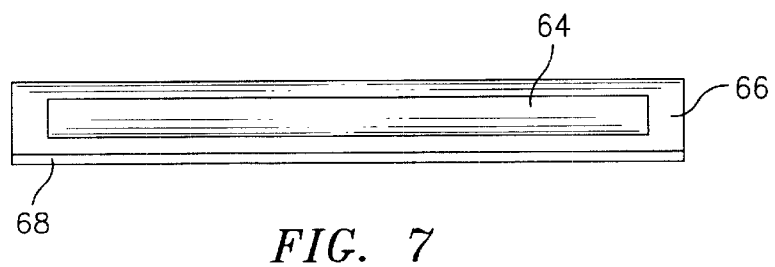
FIG. 7 is a front view of the heating element of FIG. 6.

FIG. 6 is a side view of the heating station which desirably can be in line with and downstream of the filling station as shown in FIGS. 1 and 5, wherein the neck portion 22 of the filled container 20 is heated. In accordance with FIG. 6, the filled container 20 is firmly held at the neck portion 22 by holding means 62, which may if desired inject air into the filled container and which desirably rotates the filled container during the heating operation. Heating element 64 is positioned adjacent reflector 66 with shield 68 preferably below the reflector-heating element assembly, and the filled container 20 rotated in front of the heating element by holder 62. If desired, heating elements can be positioned on two sides and the container base held on a moving platform (not shown) or the like, as with the other stations. FIG. 7 shows a front view of heating element 64, reflector 66 and shield 68. This station properly heats and conditions the neck portion for the bending operation, which is the next station in line, without adversely affecting the contents of the container.

Figure 8:
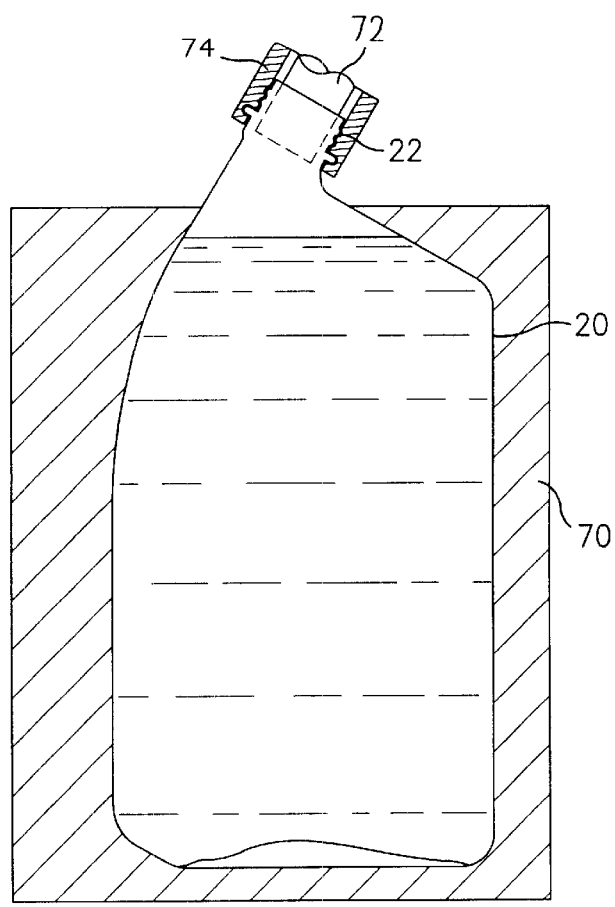
FIG. 8 is a side view of the bending station.

FIG. 8 is a side view of the neck bending station wherein the filled container 20 with heated neck 22 is held in mold 70 which is closed around the filled container. The heated neck portion 22 is engaged internally by holding means 72, which can be the same holding element used in the heating station, and externally by bending element 74 which engages the outside of neck portion 22, and the combination of holding means 64 and bending element 66 bends the heated neck portion 22 into the angled configuration shown in FIG. 8 and FIG. 3. The filled container with bent neck is then removed from the mold, the bent neck portion cooled and allowed to set, which may be done by ambient air or a separate air stream directed at the neck portion.

Figure 10:
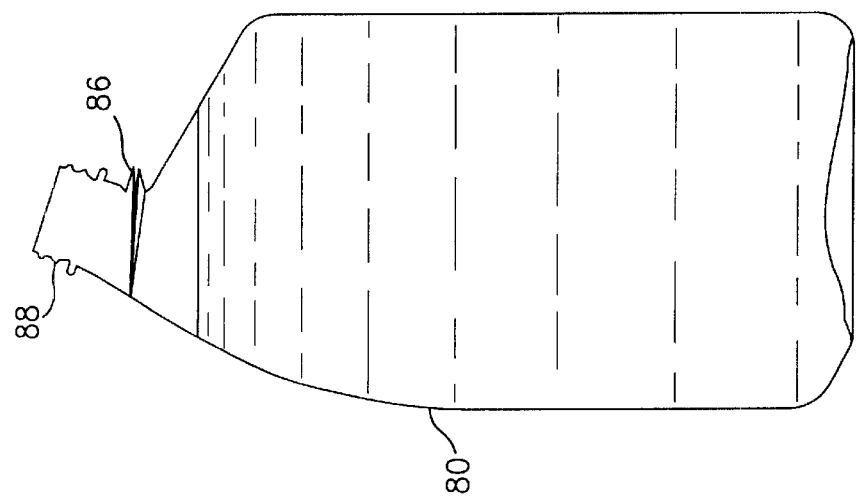
FIG. 10 is a side view of the filled bottle of FIG. 9 after neck bending.
Figure 9:
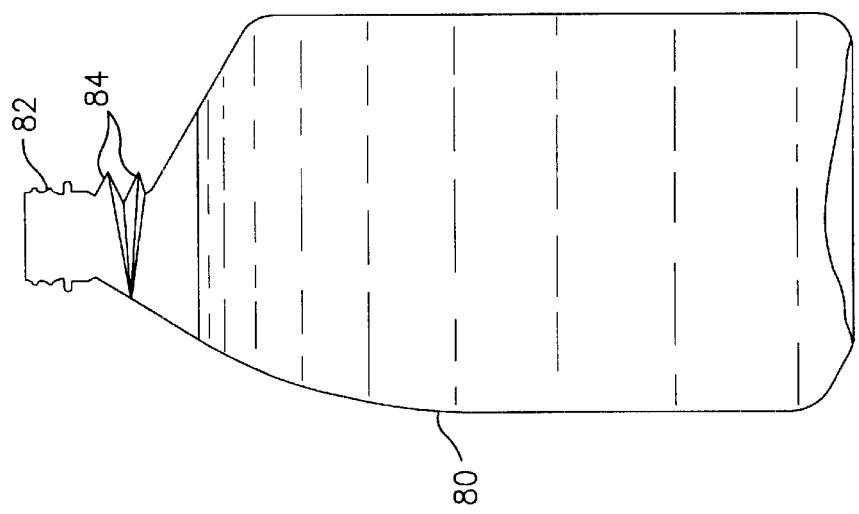
FIG. 9 is an alternate embodiment showing a side view of a filled bottle before neck bending.

FIGS. 9 and 10 show an alternate embodiment wherein blow molded container 80 with straight neck portion 82 includes at least one fold portion 84 on the neck to facilitate the bending operation. Desirably, the fold portion only partly circumscribes the neck portion and the folds are at the site of the bending operation. The filled container 80 passes through the stations as with the previous embodiment, and the heated folded portion 84 is bent to engage the folds on each other to provide engaged folds 86 and the bent neck 88 as shown in FIG. 10.

Preferably, the plastic is polyethylene terephthalate; however, other suitable thermoplastic plastics may be readily used alone or in combination or in a multilayered configuration. For example, polyolefins, polyethylene naphthalate, polyvinyl chloride, and others.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Method of forming a blow molded plastic container with a mouth and neck portion thereof which is inclined or angled with respect to the body portion of the container, which comprises:

provided a blow molded plastic container having a closed base, a body portion extending from the base, a neck portion extending from the body portion and an open mouth above the neck portion, wherein the mouth and neck portions are coaxial with the body portion; and heating the neck of the container and bending the heated neck of the container with a holding means that holds and bends the neck of the container to provide a mouth and neck portion oriented at an angle with respect to the body of the container.

2. Method according to claim 1, including the step of bending the open mouth and neck portion of the container to an angle of less than 45°, wherein in cross section one side of the upper body portion includes a gradual, inclined configuration extending to the angled neck.

3. Method according to claim 1, including providing a blow molded container of polyethylene terephthalate.

4. Method according to claim 1, including providing a blow molded container with a threaded neck portion and an outwardly extending flange beneath the threaded neck portion.

5. Method according to claim 1, including the step of filling the container with contents prior to the heating and bending steps.

6. Method according to claim 5, wherein the filling, heating and bending steps are at separate, in-line stations.

7. Method according to claim 6, wherein the filled container is rotated at the heating station.

8. Method according to claim 6, wherein the neck portion of the filled container is held internally and externally during the bending step.

9. Method according to claim 6, wherein the neck portion of the blow molded container includes at least one folded portion.

10. Method according to claim 6, wherein the folded portion partly circumscribes the neck portion.

11. Apparatus for forming a blow molded plastic container with a mouth and neck portion thereof which is inclined or angled with respect to the body portion of the container, which comprises:

providing a blow molded plastic container having a closed base, a body portion extending from the base, a neck portion extending from the body portion and an open mouth above the neck portion, wherein the mouth and neck portions are coaxial with the body portion;

heating means for heating the neck of the container; and a holding means for holding and bending the heated neck of the container to provide a mouth and neck portion oriented at an angle with respect to the body of the container.

12. Apparatus according to claim 11, wherein said holding means contacts the open mouth of the container and is operative to bend the open mouth and neck portion to an angle of less than 45°.

13. Apparatus according to claim 11, wherein the blow molded container is polyethylene terephthalate.

14. Apparatus according to claim 11, wherein the blow molded container includes a threaded neck portion and an outwardly extending flange portion beneath the threaded neck portion.

15. Apparatus according to claim 11, including filling means for filling the container with contents prior to application of said heating means and holding means.

16. Apparatus according to claim 15, including separate in-line stations for said filling means, heating means and holding means.

17. Apparatus according to claim 16, including means for rotating the filled container at the heating station.

18. Apparatus according to claim 16, including holding means internally holding the neck portion during the bending step and bending means externally holding the neck portion during the bending step.

* * * * *